(12) United States Patent
Yogeeswaran et al.

(10) Patent No.: US 11,787,736 B2
(45) Date of Patent: Oct. 17, 2023

(54) SPOOL-FREE FIBER OPTIC CABLE CONFIGURATION FOR CABLE INSTALLATION ONTO A POWERLINE CONDUCTOR

(71) Applicant: Meta Platforms, Inc., Menlo Park, CA (US)

(72) Inventors: Karthik Yogeeswaran, San Carlos, CA (US); Wayne Michael Kachmar, North Bennington, VT (US); James A. Mass, North Royalton, OH (US); Nelson Todd, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/673,540

(22) Filed: Feb. 16, 2022

(65) Prior Publication Data

US 2022/0169564 A1    Jun. 2, 2022

Related U.S. Application Data

(62) Division of application No. 16/867,313, filed on May 5, 2020, now Pat. No. 11,261,130.

(Continued)

(51) Int. Cl.
*C03C 25/002* (2018.01)
*C03B 37/012* (2006.01)
(Continued)

(52) U.S. Cl.
CPC ........... *C03C 25/002* (2013.01); *B65H 54/58* (2013.01); *C03B 37/0126* (2013.01);
(Continued)

(58) Field of Classification Search
CPC ..... C03C 25/002; C03C 25/106; B65H 54/58; B65H 2701/32; C03B 37/01257;
(Continued)

(56) References Cited

U.S. PATENT DOCUMENTS

| | | |
|---|---|---|
| 4,833,871 A | 5/1989 | Ogawa et al. |
| 5,109,658 A | 5/1992 | Garner |

(Continued)

FOREIGN PATENT DOCUMENTS

| | | |
|---|---|---|
| DE | 19820037 A1 | 11/1999 |
| FR | 2890756 A1 | 3/2007 |
| JP | 2000292666 A | 10/2000 |

OTHER PUBLICATIONS

AFL, "Lightweight Retro-fit Fibre Optic Cable," AccessWrap, May 9, 2012, 1 Page.

(Continued)

*Primary Examiner* — Andrew Jordan
(74) *Attorney, Agent, or Firm* — Greenberg Traurig, LLP

(57) ABSTRACT

A method may include (1) coating a segment of fiber optic cable with an adhesive substance, (2) forming a coil of the segment of fiber optic cable, (3) deforming the coil into a noncircular shape defining a slot external to the coil while obeying a minimum bend radius requirement for the segment of fiber optic cable, and (4) activating the adhesive substance to stabilize the noncircular shape of the coil. Various other methods and apparatuses, such as those for performing the deforming operation, are also disclosed.

12 Claims, 9 Drawing Sheets

Related U.S. Application Data

(60) Provisional application No. 62/941,615, filed on Nov. 27, 2019, provisional application No. 62/846,119, filed on May 10, 2019.

(51) Int. Cl.
 *C03C 25/106* (2018.01)
 *B65H 54/58* (2006.01)
 *G02B 6/44* (2006.01)
 *G02B 6/48* (2006.01)

(52) U.S. Cl.
 CPC ...... *C03B 37/01257* (2013.01); *C03C 25/106* (2013.01); *G02B 6/449* (2013.01); *G02B 6/4458* (2013.01); *G02B 6/486* (2013.01); *B65H 2701/32* (2013.01)

(58) Field of Classification Search
 CPC .. C03B 37/0126; G02B 6/4458; G02B 6/449; G02B 6/486; H02G 1/02; H02G 1/04; H02G 7/00; H01B 9/005; H01B 11/22
 See application file for complete search history.

(56) References Cited

U.S. PATENT DOCUMENTS

| | | | |
|---|---|---|---|
| 5,727,373 A | 3/1998 | Appleford et al. | |
| 6,000,209 A | 12/1999 | Ito et al. | |
| 6,813,421 B2 | 11/2004 | Lail et al. | |
| 6,813,422 B1 | 11/2004 | Krishnamurthy et al. | |
| 8,005,333 B2 | 8/2011 | Mullaney et al. | |
| 8,831,394 B2 | 9/2014 | Kimbrell et al. | |
| 8,919,092 B2 | 12/2014 | Figenschou et al. | |
| 9,051,153 B2 | 6/2015 | Lichoulas et al. | |
| 11,169,351 B2 | 11/2021 | Kuriloff et al. | |
| 11,261,130 B2 * | 3/2022 | Yogeeswaran | G02B 6/4458 |
| 11,262,521 B1 * | 3/2022 | Kachmar | H02G 1/02 |
| 11,353,672 B1 | 6/2022 | Mass et al. | |
| 2003/0006332 A1 | 1/2003 | Appleby et al. | |
| 2004/0071416 A1 | 4/2004 | Militaru | |
| 2004/0247271 A1 | 12/2004 | Skovgaard et al. | |
| 2008/0101753 A1 | 5/2008 | Suzuki et al. | |
| 2008/0130010 A1 | 6/2008 | Williams | |
| 2012/0211447 A1 | 8/2012 | Anderson et al. | |
| 2012/0308189 A1 | 12/2012 | Kimbrell et al. | |
| 2016/0011366 A1 | 1/2016 | Tsukamoto et al. | |
| 2016/0215130 A1 | 7/2016 | Esseghir et al. | |
| 2016/0236857 A1 | 8/2016 | Adams et al. | |
| 2017/0176703 A1 | 6/2017 | Baker et al. | |
| 2018/0074214 A1 | 3/2018 | Magne et al. | |
| 2020/0354268 A1 | 11/2020 | Yogeeswaran et al. | |
| 2020/0358268 A1 | 11/2020 | Kuriloff et al. | |
| 2022/0169564 A1 * | 6/2022 | Yogeeswaran | G02B 6/449 |

OTHER PUBLICATIONS

"Carbon Black," Wikipedia, Oct. 23, 2020, 6 pages, Retrieved from the Internet: URL: https://en.wikipedia.org/w/index.php?title=Carbon_black&oldid=985037981.

"Cross-linked Polyethylene," Wikipedia, Sep. 19, 2020, 15 pages, Retrieved from the Internet: URL: https://en.wikipedia.org/w/index.php?title=Cross- inked_polyethylene&oldid=979194209.

"Fiber Optic Cable," SkyWrap, AFL, Jun. 25, 2014, pp. 59-60.

"Frequently Asked Questions," AFL, SkyWrap Information, Jul. 23, 2013, pp. 1-2.

International Search Report and Written Opinion for International Application No. PCT/US2020/032046, dated Jul. 22, 2020, 9 pages.

International Search Report and Written Opinion for International Application No. PCT/US2020/032103, dated Aug. 25, 2020, 10 Pages.

"Kevlar," Wikipedia, Sep. 19, 2020, 11 pages, Retrieved from the Internet: URL: https://en.wikipedia.org/w/index.php?title=Kevlar&oldid=979269720.

"Polyethylene," Wikipedia, Oct. 16, 2020, 17 pages, Retrieved from the Internet: URL: https://en.wikipedia.org/w/index.php?title=Polyethylene&oldid=983809595.

"Swellcoat Blocker," Fiberline, Oil & Gas, Fiber-Line Waterblocking Yams, Oct. 27, 2020, 1 Page.

* cited by examiner

SPOOL-FREE FIBER OPTIC CABLE CONFIGURATION FOR CABLE INSTALLATION ONTO A POWERLINE CONDUCTOR

CROSS REFERENCE TO RELATED APPLICATION

This application is a divisional of U.S. Non-Provisional patent application Ser. No. 16/867,313, filed 5 May 2020, which claims the benefit of U.S. Provisional Application No. 62/846,119, filed 10 May 2019, and U.S. Provisional Application No. 62/941,615, filed 27 Nov. 2019, the disclosure of each of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

The accompanying drawings illustrate a number of exemplary embodiments and are a part of the specification. Together with the following description, these drawings demonstrate and explain various principles of the present disclosure.

Figure 1:
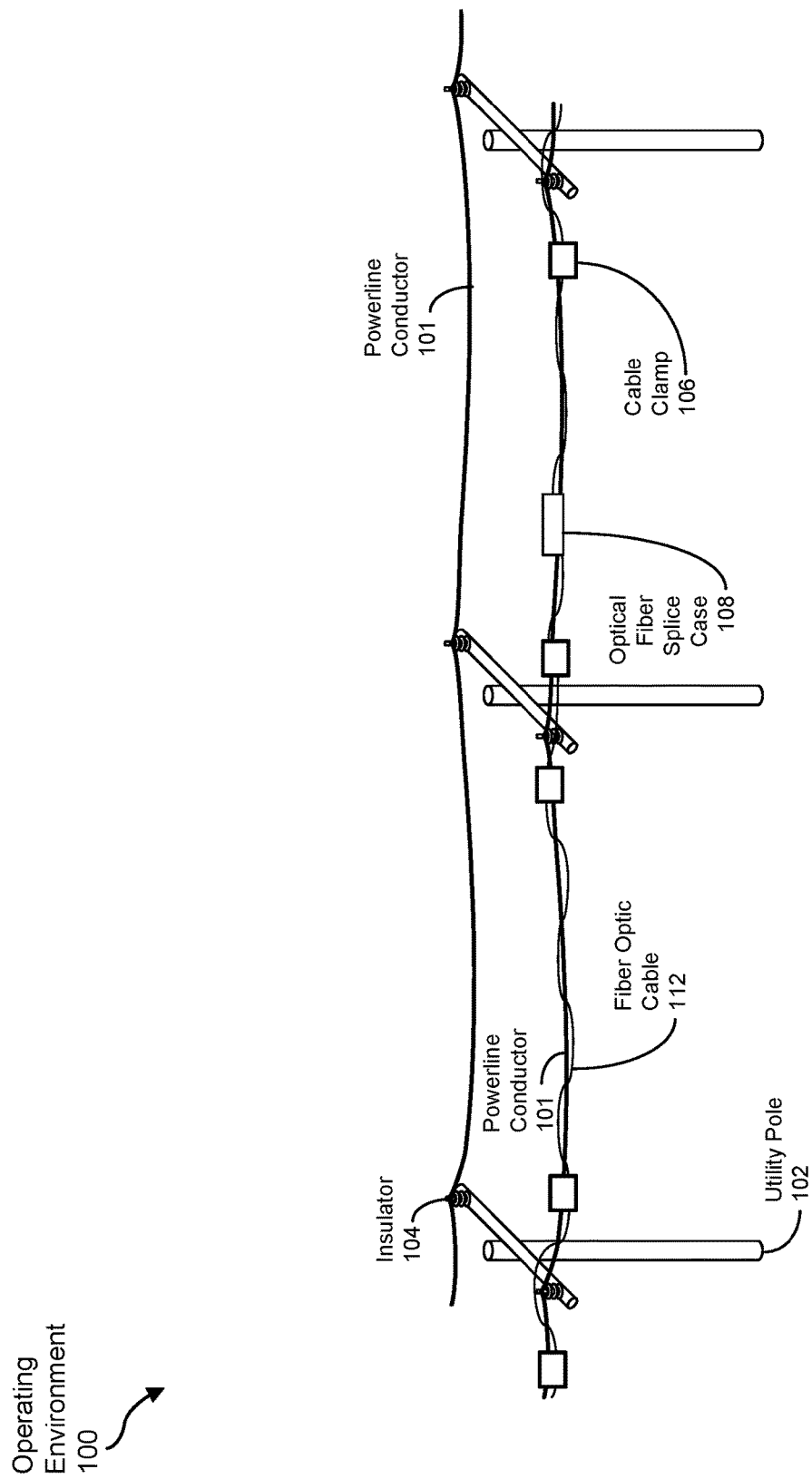
FIG. 1 is a graphical representation of an exemplary operating environment including a powerline conductor, to which various exemplary embodiments may be applied.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Robotic devices may be employed to install fiber optic cable onto preexisting power infrastructure, such as powerline conductors for electrical power transmission and distribution lines, by way of helically wrapping the fiber optic cable about the powerline conductor. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline conductor (e.g., between towers or poles) while a rotation subsystem of the device helically wraps the fiber optic cable about the conductor.

Traditionally, the robotic device carries the fiber optic cable on a spool from which the cable is paid out as the cable is wrapped about the powerline conductor. Further, to facilitate the wrapping, the spool is typically mounted on a mechanical arm that rotates about the powerline conductor. Moreover, a counterweight is sometimes employed to balance the weight of the spool, thus contributing to the overall weight of the robotic system.

The present disclosure is generally directed to systems and methods for providing a "spool-free" fiber optic cable configuration or bundle for installation of the fiber optic cable on a powerline conductor. As will be explained in greater detail below, embodiments of the present disclosure may facilitate a deployable bundle of fiber optic cable that is of lower mass and that may be positioned closer to the powerline conductor to promote robotic system mechanical stability compared to more traditional fiber optic cable installation systems.

Features from any of the embodiments described herein may be used in combination with one another in accordance with the general principles described herein. These and other embodiments, features, and advantages will be more fully understood upon reading the following detailed description in conjunction with the accompanying drawings.

The following will provide, with reference to FIGS. 1-9, detailed descriptions of apparatuses and methods for providing a spool-free fiber optic cable configuration for cable installation on a powerline conductor. A brief description of an exemplary operating environment in which a robotic system for installing fiber optic cable may be employed is provided in connection with FIG. 1. An exemplary payload subsystem that may be used with such a robotic system is discussed in associated with FIG. 2. An exemplary spool-free fiber optic cable bundle transformation for shaping a preliminary bundle of fiber optic cable into a deployable bundle for installation on a powerline conductor is described in conjunction with FIG. 3, and a method of providing such a deployable bundle is discussed in connection with FIG. 4. In association with FIGS. 5-9, various apparatuses and operations involved in providing a spool-free cable configuration are described.

FIG. 1 is a graphical representation of an exemplary operating environment 100 in which various embodiments disclosed herein may be utilized. As depicted in the example of FIG. 1, operating environment 100 may include an electrical power transmission or distribution system having a plurality of utility poles 102 carrying multiple powerline conductors 101. Examples of powerline conductors 101 may include stranded cables, but powerline conductors 101 are not restricted to such embodiments. While any number of powerline conductors 101 may be carried via utility poles 102, two powerline conductors 101 are illustrated in FIG. 1 for visual simplicity. In some examples, powerline conductors 101 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 101 may be included and covered in various embodiments of operating environment 100 discussed below. Additionally, powerline conductors 101 may include one or more phase conductors, ground wires, static wires, or other conductors supported by utility poles 102, towers, or the like.

Also shown in FIG. 1 is a fiber optic cable 112 aligned with, and mechanically coupled to, powerline conductor 101. In some embodiments, fiber optic cable 112 may be helically wrapped about powerline conductor 101, such as by way of a human-powered or electrically powered robotic device. However, other physical relationships between powerline conductor 101 and fiber optic cable 112 are also possible. While only one fiber optic cable 112 is depicted in FIG. 1, multiple powerline conductors 101 employing the same utility poles 102 may each have a corresponding fiber optic cable 112 attached or otherwise coupled thereto. As depicted in FIG. 1, fiber optic cable 112 may be secured to powerline conductor 101 via one or more cable clamps 106. In some examples, fiber optic cable 112 may follow a powerline conductor 101 associated with a particular phase of the power being transmitted, or fiber optic cable 112 may alternate between two or three different phases. Moreover, each fiber optic cable 112 may carry one or more optical fibers for facilitating communication within operating environment 100.

Additionally, FIG. 1 illustrates an optical fiber splice case 108 that, in some embodiments, splices together corresponding ends of optical fibers of fiber optic cable 112. For example, relatively long stretches (e.g., multiple-kilometer spans) of fiber optic cable 112 that may be coupled to powerline conductor 101 may be mechanically coupled together, thermally fused together, or otherwise coupled in optical fiber splice case 108, which may include optical couplers, amplifiers, and/or other components to facilitate transmission of optical data signals from one span of fiber optic cable 112 to the next. Additionally, in some embodiments, optical fiber splice case 108 may include wireless access points and other networking components (e.g., for communication with Internet of Things (IoT) devices, smart grid sensors (e.g., voltage sensors, current sensors, and the like), and user access networks). Moreover, optical fiber splice case 108 may include optical, electromagnetic, and other types of sensors to measure powerline conditions; environmental sensors for measuring temperature, humidity, and so on; video cameras for surveillance; and the like. To power such components, optical fiber splice case 108 may also include solar cells and/or batteries. In some examples, such as that shown in FIG. 1, optical fiber splice case 108 may be attached to, or positioned on or near, powerline conductor 101, as opposed to being mounted on a lower portion of utility pole 102, thus potentially eliminating the use of a phase-to-ground transition that otherwise may be coupled with each length of fiber optic cable 112 to provide electrical isolation from powerline conductor 101.

Figure 2:
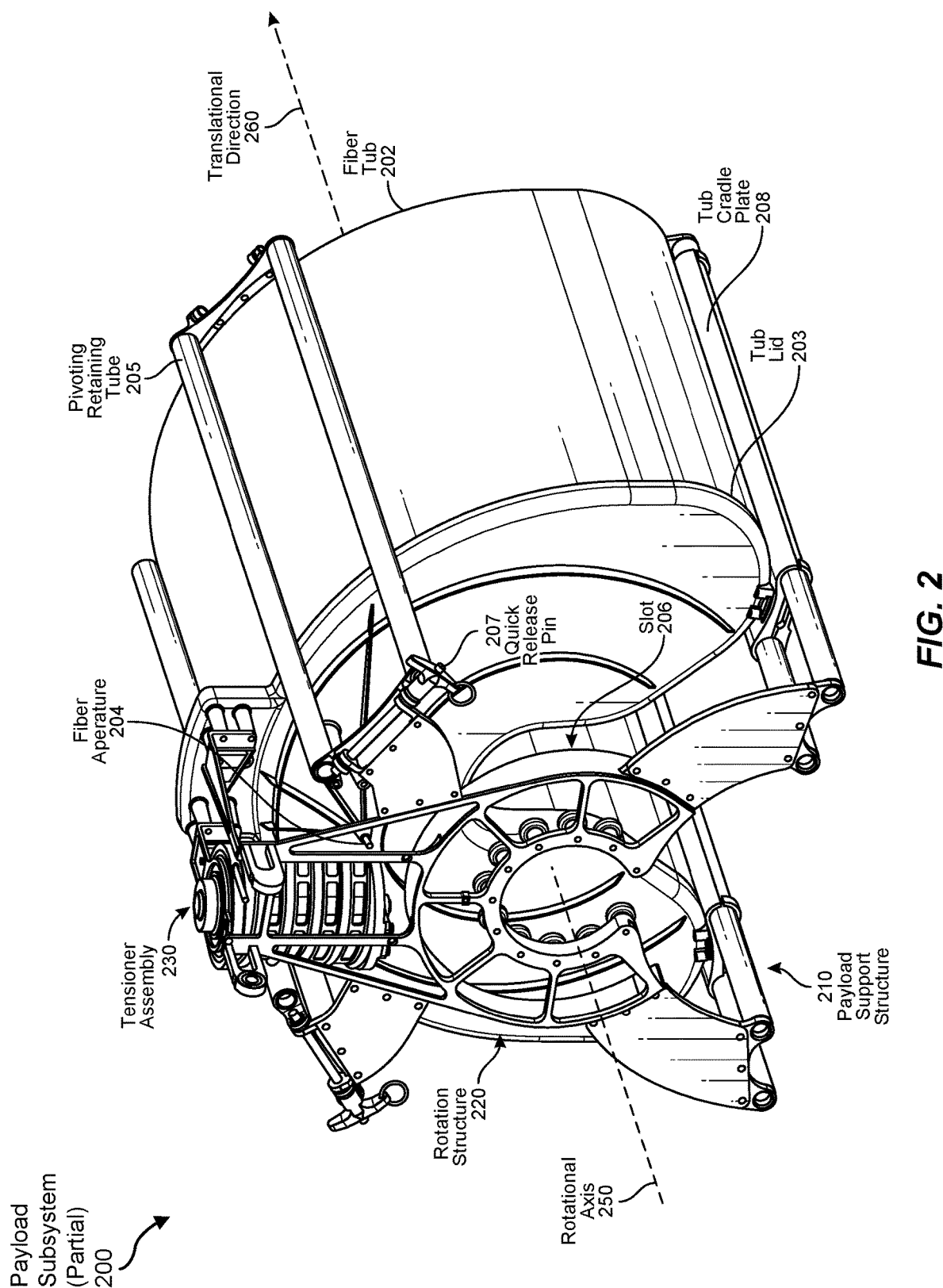
FIG. 2 is a perspective partial view of an exemplary payload subsystem employable in a robotic system for installing a fiber optic cable about a powerline conductor.

FIG. 2 is a perspective partial view of an exemplary payload subsystem 200 that may be configured to carry a fiber tub 202, within which a segment of fiber optic cable 112 to be installed on powerline conductor 101 is stored. In some examples, payload subsystem 200, while being carried by a robotic system translating along powerline conductor 101, may be rotated about powerline conductor 101 to pay out fiber optic cable 112, thus helically wrapping fiber optic cable 112 about powerline conductor 101.

More specifically, as illustrated in FIG. 2, payload subsystem 200, in some embodiments, may include tub cradle plates 208 upon which fiber tub 202 may rest. In addition, pivoting retaining tubes 205 may pivot about corresponding hinges and restrain fiber tub 202 by way of free ends of pivoting retaining tubes 205 being secured using quick-release pins 207. Consequently, fiber tub 202 may be removably attached to payload subsystem 200, thus facilitating the loading of a segment of fiber optic cable 112 into fiber tub 202 by way of an opening that may be covered by a tub lid 203 prior to installation on payload subsystem 200. Further, tub lid 203 may include a fiber aperture 204 through which fiber optic cable 112 may be drawn during installation. In operation, the robotic system, of which payload subsystem 200 is a part, may travel in a translation direction 260 along powerline conductor 101 while payload subsystem 200 is rotated (e.g., via a motor operating on a rotation structure 220, which may include a ring, bearings, and/or the like) about a rotational axis 250 that may coincide with powerline conductor 101. Accordingly, when an end of fiber optic cable 112 is coupled to powerline conductor 101, the rotation of payload subsystem 200 during the translation of the robotic system along powerline conductor 101 results in the helical wrapping of fiber optic cable 112 about powerline conductor 101. Additionally, in some examples, a tensioner assembly 230, through which fiber optic cable 112 may pass upon exiting fiber tub 202, may control an amount of tension of fiber optic cable 112 (e.g., using one or more clutch plates or other friction-inducing mechanisms) as fiber optic cable 112 is wrapped about powerline conductor 101.

As shown, fiber tub 202 may be shaped to define a slot 206 that may at least partially surrounding powerline conductor 101 when fiber tub 202 is installed on payload subsystem 200, thus possibly resulting in a center of mass of the segment of fiber optic cable 112 in fiber tub 202 remaining close to powerline conductor 101 relative to a strictly cylindrical tub. More specifically, in some examples, fiber tub 202 may revolve or orbit about powerline conductor 101, and further may rotate once per revolution about powerline conductor 101, as may result from the illustration of FIG. 2. Accordingly, the center of mass of payload subsystem 200, including fiber optic cable 112 within fiber tub 202, may remain close to powerline conductor 101 during the installation operation, thus facilitating mechanical balance and stability of the robotic system throughout (e.g., without the use of a counterweight or other mechanical balancing structure).

Figure 3:
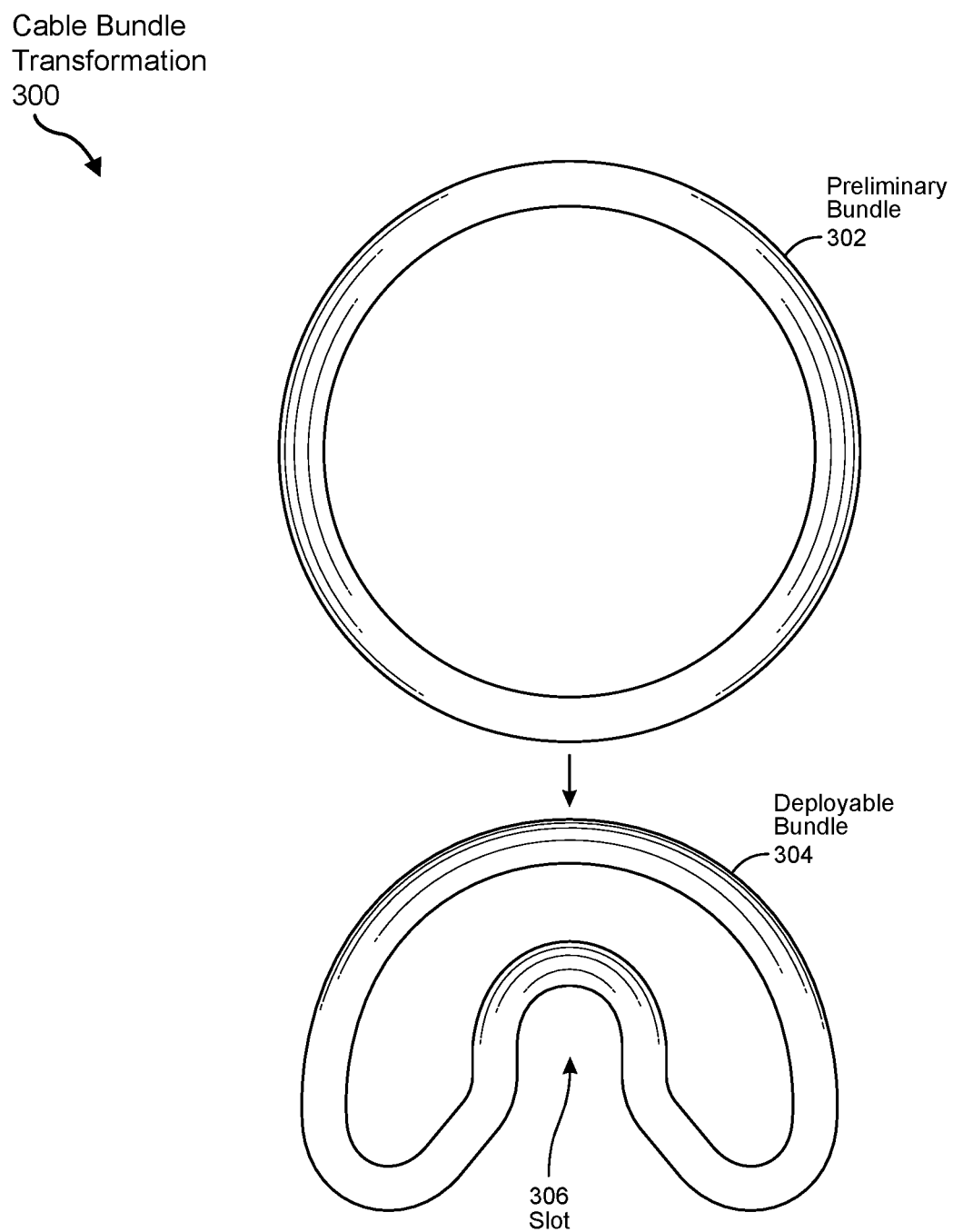
FIG. 3 is an end view of an exemplary cable bundle transformation for shaping or transforming a preliminary bundle of spool-free fiber optic cable into a deployable bundle for installation about a powerline conductor.

FIG. 3 is an end (or cross-sectional) view of a representation of a cable bundle transformation 300 of a bundle of fiber optic cable 112 prior to deployment on a robotic system used for installation on powerline conductor 101. More specifically, a preliminary bundle 302 (e.g., a circular coil) of fiber optic cable 112 may be transformed (e.g., reshaped by mechanical forces) to a deployable bundle 304 that may generally conform to the internal shape of fiber tub 202 for placement therein for installation on powerline conductor 101, as described above. Moreover, in some embodiments, the shaping of preliminary bundle 302 may result in deployable bundle 304 defining a slot 306 external to deployable bundle 304 (e.g., outside the coil of fiber optic cable 112 that forms deployable bundle 304) that aligns with slot 206 of fiber tub 202, which allows fiber tub 202 and the enclosed deployable bundle 304 to possess a center of mass located near powerline conductor 101 due to fiber tub 202 and deployable bundle 304 at least partially surrounding powerline conductor 101 during the helical wrapping of fiber optic cable 112 about powerline conductor 101. Additionally, in some examples, deployable bundle 304 may be configured such that deployable bundle 304, either during the shaping operation or afterward, does not violate a minimum bend radius requirement for fiber optic cable 112, as cited by the manufacturer of fiber optic cable 112, at any location in deployable bundle 304.

In some embodiments, an "inner wind" process (e.g., a winding process that results in the paying out of fiber optic cable 112 from an internal surface of deployable bundle 304 nearest a central axis of deployable bundle 304) may be used for some fiber optic cables 1122 (e.g., for fiber optic cable 112 possessing a diameter of approximately one-eighth of an inch). This embodiment may use a precision wind (e.g., a cable configuration in which each turn of fiber optic cable 112 contacts an immediately preceding or subsequent turn) to maximize packing density. However, in other embodiments, a helix wind (e.g., a deployable bundle 304 in which the turns of fiber optic cable 112 may form helixes stacked atop one another, but where each turn may not contact an immediately preceding or subsequent turn) may be utilized to allow for higher speed cable payout at the cost of cable packing density.

Although the embodiments described above employ a combination of straight sections and curved sections for the final shape of deployable bundle 304, other shapes for deployable bundle 304 may be used in other embodiments.

Figure 4:
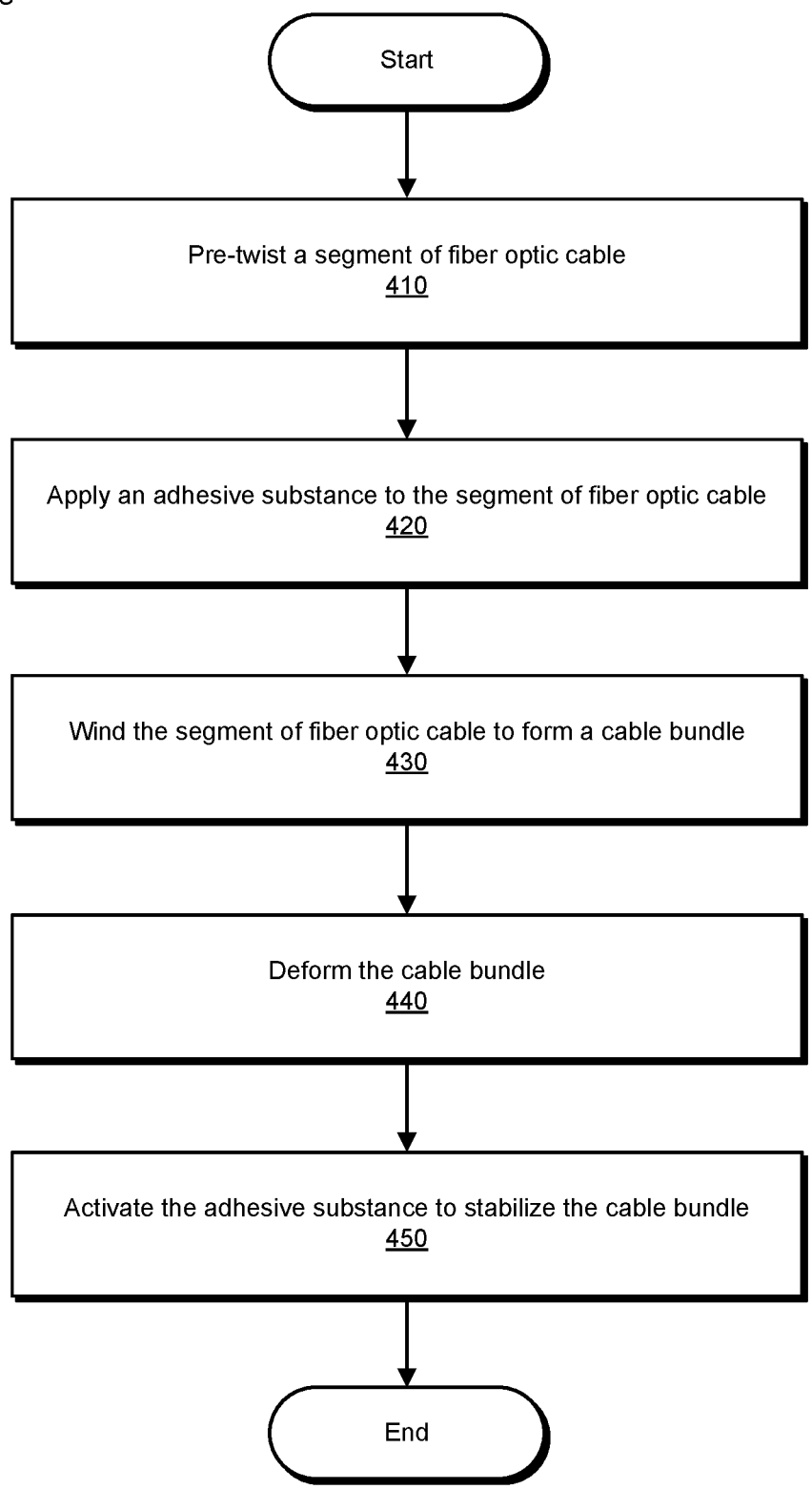
FIG. 4 is a flow diagram of a method of manufacturing a deployable bundle of fiber optic cable.

FIG. 4 is a flow diagram of a method 400 of manufacturing a spool-free configuration for fiber optic cable 112 (e.g., deployable bundle 304). The steps shown in FIG. 4 may be performed by any suitable apparatus, including the apparatuses described in greater detail below. In one example, each of the steps shown in FIG. 4 may represent an algorithm executed by a processor-based system, where that algorithm includes and/or is represented by multiple substeps, examples of which are described in greater detail below.

As illustrated in FIG. 4, at step 410, the segment of fiber optic cable 112 may be "pre-twisted" such that fiber optic cable 112, during installation onto powerline conductor 101, does not possess undesirable twists when helically wrapped about powerline conductor 101 that may impart binding or other undue stress upon fiber optic cable 112 (e.g., by way of the pre-twist substantially canceling out twisting of fiber optic cable 112 that may occur during the helical wrapping). At step 420, an adhesive substance (e.g., wax) may be applied to the segment of fiber optic cable 112 (e.g. such that the segment of fiber optic cable 112 may subsequently hold its configuration (e.g., deployable bundle 304) during loading into fiber tub 202, during installation of fiber optic cable 112 onto powerline conductor 101, and so on). At step 430, the segment of fiber optic cable 112 may be wound to form a cable bundle (e.g., a substantially circular bundle). At step 440, the cable bundle may be deformed (e.g., to form a non-circular deployable bundle 304 or configuration that facilitates close positioning of the bundle to powerline conductor 101 while being rotated thereabout, such as by way of cable bundle transformation 300). At step 450, the adhesive substance may be activated (e.g., heated) to stabilize the bundle (e.g., bonding the bunding together so that it may retain its current configuration).

While method 400 implies a particular set of operations in a particular order, some steps 410-450 may be combined, and the order of some steps 410-450 may be altered. For example, the adhesive substance may be applied during the creation of an inner wind cable bundle as described herein, or the adhesive substance may be applied during cable manufacturing before being loaded onto a manufacturer-supplied reel. Alternatively, the adhesive substance may be sprayed onto a spool as it is being wound onto a deforming fixture reel. Other variations of method 400 are also possible. Moreover, as employed herein, an adhesive substance may be any compound or other substance that possesses at least some adhesive quality (e.g., to temporarily adhere portions of fiber optic cable 112 to itself to maintain the bundle) and is not limited to substances typically labeled as adhesives.

FIGS. 5-9 depict various views of possible apparatuses employable in providing a spool-free cable configuration. However, other possible apparatuses not specifically described herein may be used in other embodiments. For example, FIG. 5 includes perspective views of a pre-twisting apparatus 500 for a segment of fiber optic cable 112. In some embodiments, an acceptable pre-twist or pre-torsion of fiber optic cable 112 may depend on the way in which resulting deployable bundle 304 will be oriented during payout of fiber optic cable 112 onto powerline conductor 101. For the case of a helical wrapping operation, as indicated above, an acceptable pre-twist may be specific to the implementation of the robotic system performing the installation. Moreover, if the robotic system is configured to rotate deployable bundle 304 as it orbits deployable bundle 304 around powerline conductor 101, then the pre-twist may be configured to be less than a full cancellation of the pigtail twist such that the combination of the pre-twist and rotation of deployable bundle 304 results in installed fiber optic cable 112 wrapped about powerline conductor 101 with little-to-no twist.

In some embodiments, the pre-twist may be performed by turning a source spool end-over-end as fiber optic cable 112 is fed onto a take-up spool. Alternatively, the pre-twist can be generated by way of: (1) acquiring fiber optic cable 112 from the manufacturer on a spool with a hub diameter, spool height, and cable thickness equal to a target spool or reel thickness, diameter, and height, and (2) placing fiber optic cable 112 in a "fly fixture" and paying out fiber optic cable 112 onto an intermediate spool of arbitrary size (e.g., a spool large enough to carry the total fiber length of the segment of fiber optic cable 112).

Figure 5:
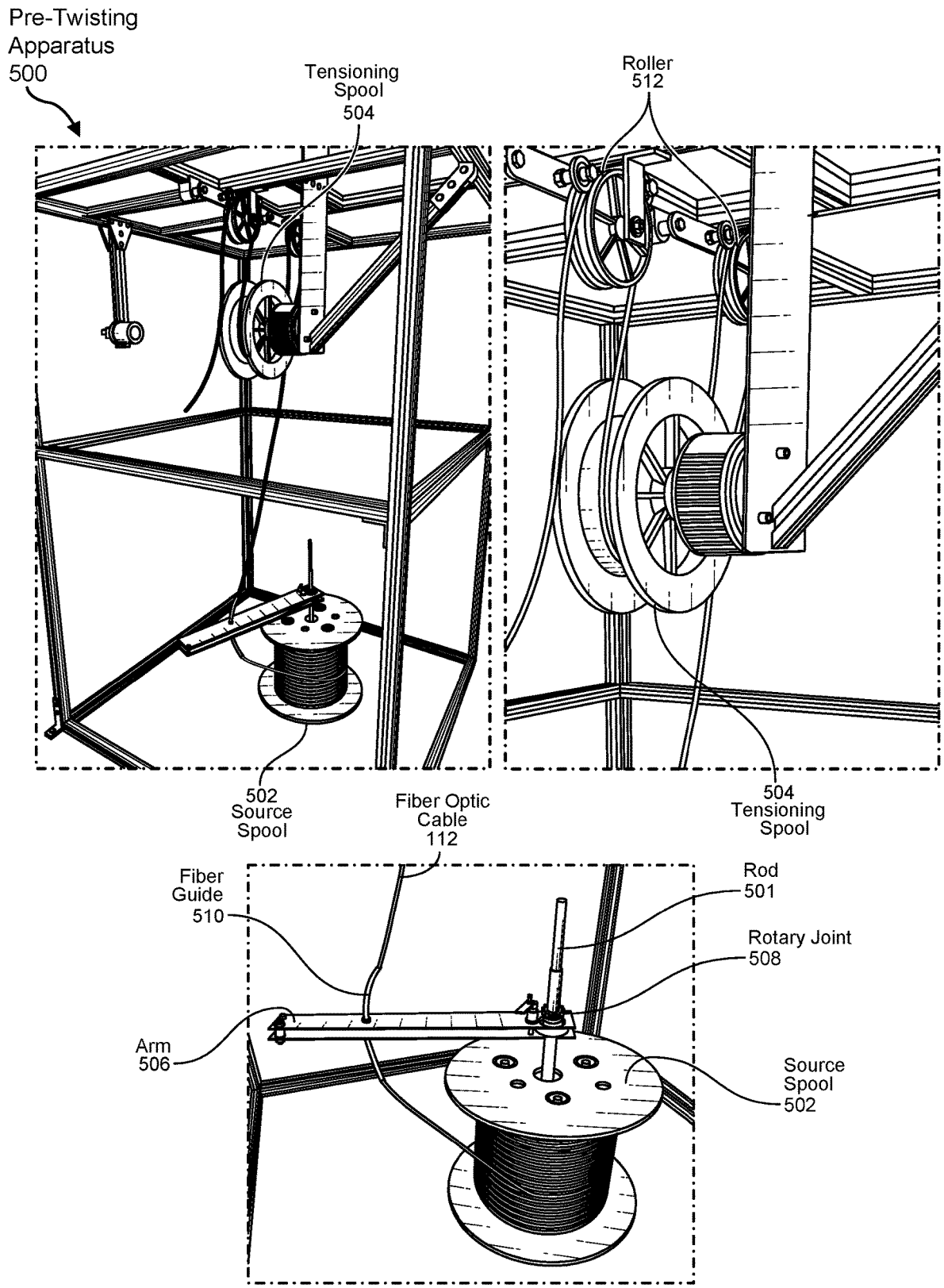
FIG. 5 includes perspective views of a pre-twisting apparatus for a segment of fiber optic cable.

FIG. 5 includes various perspective views of a pre-twisting apparatus 500 that may serve as the fly fixture referenced above. While FIG. 5 and other illustrations presented herein depict various types of prototype-level apparatuses for performing various operations, other embodiments may operate in a similar manner to those apparatuses described herein while being more compatible with a high-throughput production environment.

In some embodiments, pre-twisting apparatus 500 may include a baseplate (not visible in FIG. 5) on which a stationary rod 501 is mounted at a center of the baseplate. A source spool 502 may be placed on the baseplate with rod 501 passing through a center of source spool 502. The orientation of source spool 502 may be selected based on whether a clockwise or counterclockwise pre-twist is desired. An arm 506 of pre-twisting apparatus 500 is pivotally attached to, and extends radially from, rod 501. In some examples, arm 506 may include a rotary joint 508 to allow arm 506 to rotate relative to stationary rod 501. Examples of rotary joint 508 may include, but are not limited to, a torque clutch, a magnetic clutch, a ball bearing, a speed limiting bearing, a one-way bearing, or another type of rotary joint. In one embodiment, rotary joint 508 may include a spring-loaded pawl and ratcheting joint. At or near a distal end of arm 506, a fiber guide 510 may be held vertically. The ends of fiber guide 510 may be curved to allow fiber optic cable 112 to pass from the surface of source spool 502 through fiber guide 510 and up above without violating the minimum bend radius of fiber optic cable 112. In one embodiment, fiber guide 510 may be a nonstick tube selected with its inner diameter and stiffness matching the requirements of fiber optic cable 112. Above rod 501 of pre-twisting apparatus 500, fiber optic cable 112 may be collected through a funnel or pair of interlocking V-groove wheels (not shown in FIG. 5). Fiber optic cable 112 may be passed over a series of rollers 512 in conjunction with a tensioning spool 504 that may be coupled with a magnetic brake or clutch to control the tension of fiber optic cable 112 (e.g., on a portion of fiber optic cable 112 exiting and/or entering tensioning spool 504).

The presence of an intermediate spool (not illustrated in FIG. 5) in pre-twisting apparatus 500 for accepting pre-twisted fiber optic cable 112 from tensioning spool 504 may facilitate a proper orientation of fiber optic cable 112 onto a final spool or reel (also not depicted in FIG. 5), as described below. For example, if fiber optic cable 112 were paid out from source spool 502 (e.g., via tensioning spool 504) directly to a final or target reel or spool, the outermost layer of fiber optic cable 112 residing on source spool 502 may become the innermost layer of fiber optic cable 112 on the target spool or reel. As pre-twisting apparatus 500 twists fiber optic cable 112 with a pitch equal to the circumference of fiber optic cable 112 on source spool 502, for this pre-twist to cancel the pigtail effect of the final cable bundle (e.g., deployable bundle 304), swapping the order of the ends of fiber optic cable 112 may be desired, with the start of fiber optic cable 112 becoming the end of fiber optic cable 112, and vice-versa. This swapping may be performed by first winding fiber optic cable 112 from tensioning spool 504 onto the intermediate spool before proceeding to winding fiber optic cable 112 onto a final reel or spool, as discussed below.

In operation, using pre-twisting apparatus 500, fiber optic cable 112 may be drawn over rollers 512 and tensioning spool 504, which in turn may cause fiber optic cable 112 to be pulled from source spool 502. In response, arm 506 may swing around rod 501 while guiding fiber optic cable 112 over the flange of source spool 502. To prevent unnecessary motion, rotary joint 508 may be used to inhibit backwards travel of arm 506 or to limit the speed of the rotation of arm 506.

In using pre-twisting apparatus 502 as a fly mechanism, paying out fiber optic cable 112 from source spool 502 without turning source spool 502 pre-twists fiber optic cable 112. By setting up the spool payout conditions in such a manner, the resulting pre-twist may be oriented in the opposite direction from the resulting twist that may occur when paying fiber optic cable out from a final inner-wound deployable bundle 304, thereby cancelling that twist. To enhance the effectiveness of this cancellation, the circumference, height, and orientation of source spool 502 may be matched with that of the final spool or reel (e.g., through the use of the intermediate spool).

Figure 6:
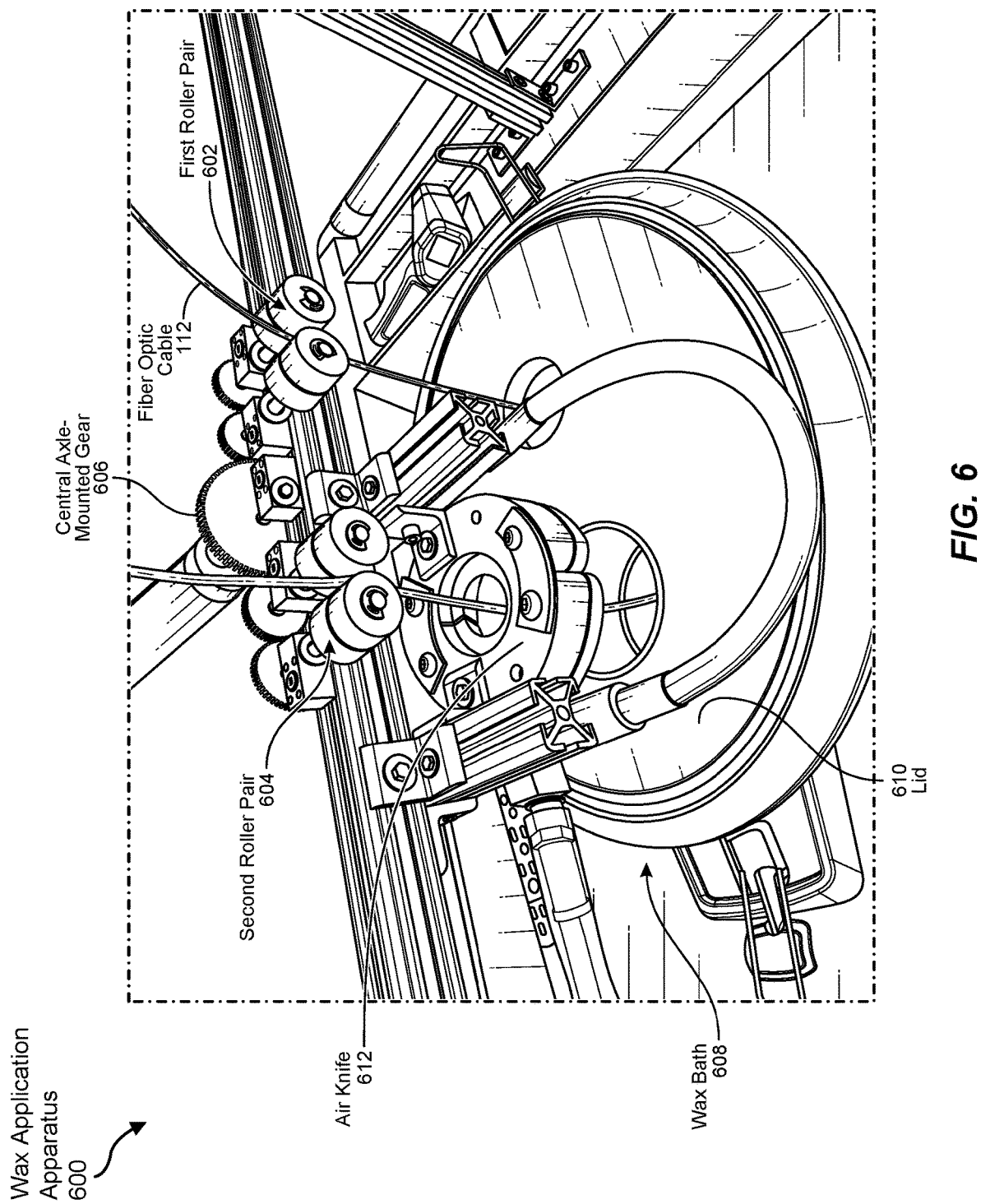
FIG. 6 is a perspective view of a wax application apparatus for a segment of fiber optic cable.
Figure 7:
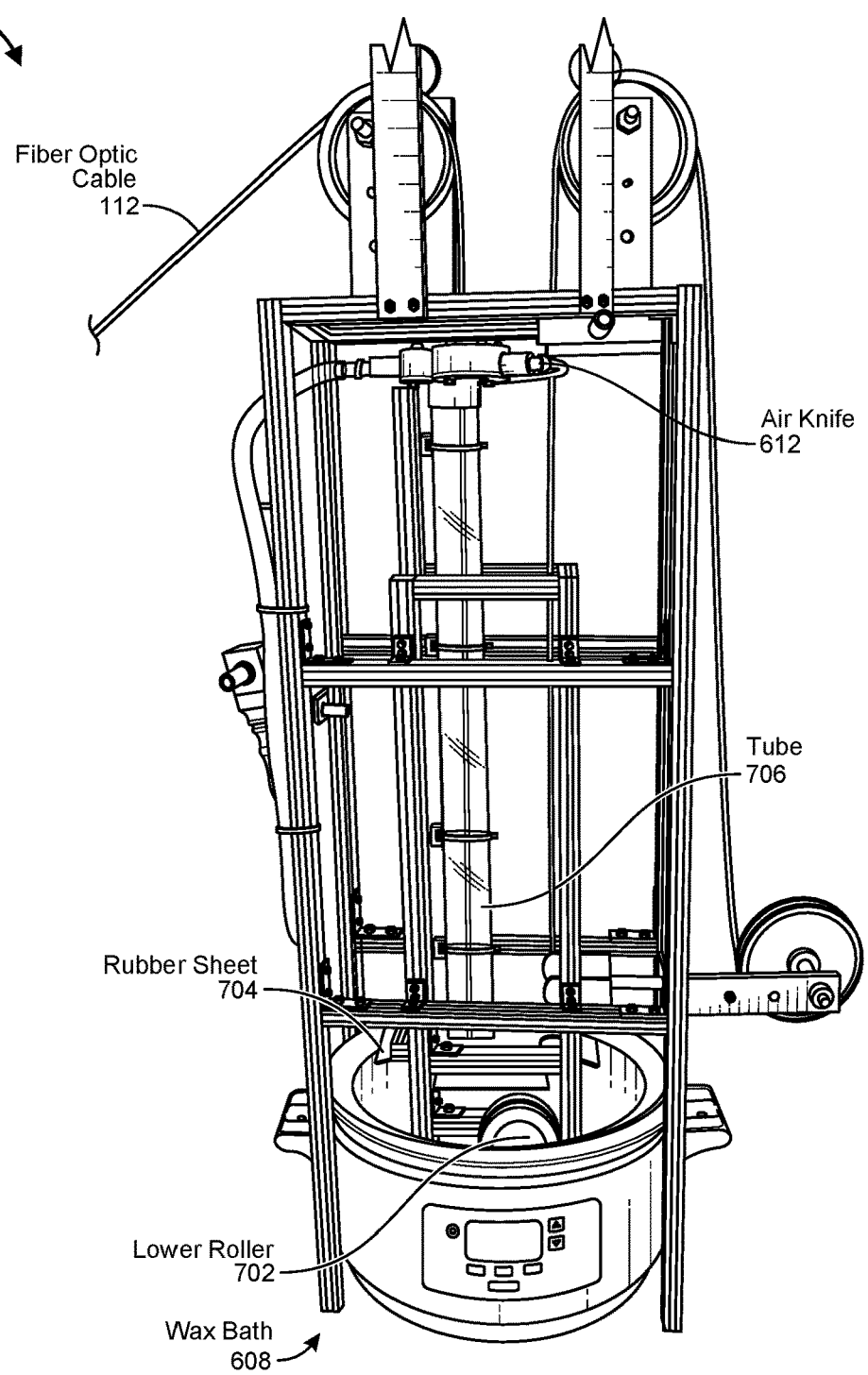
FIG. 7 is a perspective view of another wax application apparatus for a segment of fiber optic cable.

FIG. 6 is a perspective view of a wax application apparatus 600 for the segment of fiber optic cable 112. As mentioned earlier, the wax, or another adhesive substance, may be applied during the manufacturing of fiber optic cable 112 (e.g., onto a jacket of fiber optic cable 112, which may include a polyethylene, a cross-linked polyethylene, or another material), or by means of spraying during a winding operation onto a final reel or spool instead of as an intermediate step in this process, as outlined herein. In some examples, use of wax application apparatus 600 may cause the deposition of a thin coating of wax on the jacket of fiber optic cable 112. In some embodiments, a desired coating thickness may be between 30 and 100 microns. Also, the wax, in some examples, may be applied so that the wax does not bond together the layers of fiber optic cable 112, when residing on a spool or reel, until a later stage of the process. In some examples, a wax sprayer may be employed to atomize the wax into small particles that settle, like dust, on the surface of fiber optic cable 112 without adhering or bonding to that surface. In other embodiments, the wax may be coated on the jacket of fiber optic cable 112 while ensuring the wax is dried or cooled fully before fiber optic cable 112 is wound onto a spool or reel to prevent the layers of fiber optic cable 112 from bonding together prematurely.

The following describes one method for applying wax as a coating to fiber optic cable 112 (e.g., using wax application apparatus 600). However, other ways for applying wax or another adhesive are also possible, as illustrated in a wax application apparatus 700 depicted in FIG. 7. In the embodiment of FIG. 6, fiber optic cable 112 may be fed from an originating spool (not shown in FIG. 6). The payout tension from the originating spool, in some examples, may be controlled by a tensioning mechanism. In one embodiment, the tensioning mechanism may include a magnetic hysteresis brake with adjustable tension. The originating spool may be a spool carrying the output from pre-twisting apparatus 500 (e.g., an intermediate spool, as described above). In some embodiments, the originating spool and/or fiber optic cable 112 may be warmed before being passed to wax application apparatus 600.

From the originating spool, fiber optic cable 112 may be passed over a set of idler rollers (not shown in FIG. 6) in some embodiments to change the orientation to direct fiber optic cable 112 downward. Wax application apparatus 600, in some examples, may include two pairs of rollers (e.g., a first roller pair 602 and a second roller pair 604) geared such that a central axle-mounted gear 606 turns first roller pair 602 together to push fiber optic cable 112 placed therebetween downward while second roller pair 604 pushes fiber optic cable 112 upward (e.g., at a same speed as that imparted on fiber optic cable 112 by first roller pair 602). In some examples, first roller pair 602 and second roller pair 604 may be of the form of caterpillar pullers or have a texture to improve grip on fiber optic cable 112. Central axle-mounted gear 606 may be driven by a motor, or connected via belt, chain, or other gear to the motor, which may also drive a take-up reel (not depicted in FIG. 6) for fiber optic cable 112 after application of the adhesive. Between first roller pair 602 and second roller pair 604, fiber optic cable 112 may form a consistent U-shape based on first roller pair 602 and second roller pair 604 being geared together such that an equal amount of fiber optic cable 112 is fed downward by first roller pair 602 as is also pulled upward by second roller pair 604. In some examples, at least a portion of the U-shape of fiber optic cable 112 may be immersed in a wax bath 608. Other methods of immersing fiber optic cable 112 in wax bath 608 or similar apparatus may be employed in other examples, such as placing a submerged roller 702 in wax bath 608 (e.g., as shown in wax application apparatus 700 of FIG. 7), under which fiber optic cable 112 passes with a caterpillar puller or geared roller pushing and/or pulling fiber optic cable 112 on either side of submerged roller 702 to hold fiber optic cable 112 in tension, thus providing enhanced control of fiber optic cable 112 as it passes through wax bath 608 and/or other components.

In some embodiments, wax bath 608 may be a heated bath of molten wax or similar material. Further, wax application apparatus 600 may include a squeegee or other wax-reducing component (not shown in FIG. 6). The molten bath of wax may be set to a temperature that produces a desired viscosity of the wax while preventing fiber optic cable 112 from being subjected to a temperature that may adversely affect the operation of fiber optic cable 112. In some examples, the wax may be paraffin or another formula tuned to improve adhesion to the jacket of fiber optic cable 112 while maintaining a relatively low melting temperature. Also, in some embodiments, the wax may be paraffin blended with vinyl acetate. Further, the wax and vinyl acetate blend may be further mixed with an adhesive (e.g., an environmentally triggered adhesive, such as a low-energy ultraviolet-activated adhesive, a water-activated adhesive, or the like), or the adhesive may be applied to fiber optic cable 112 prior to applying the wax or wax/vinyl acetate blend. Consequently, in some examples, as the segment of fiber optic cable 112 is installed by the robotic system onto powerline conductor 101, the adhesive may be passively activated by the environment, or more actively (e.g., by way of an ultraviolet lamp carried on the robotic system). Consequently, in the event fiber optic cable 112 is severed after being installed on powerline conductor 101, the adhesive may prevent fiber optic cable 112 from becoming unraveled from powerline conductor 101 and creating a hazard.

Wax bath 608 may include a lid 610 with two openings or apertures, one for fiber optic cable 112 to enter wax bath 608, and another for fiber optic cable 112 to exit. In some examples, the exit aperture may be used to support the squeegee to wipe away excess wax on fiber optic cable 112. The squeegee may be made of rubber, felt, or other such material. In the case of rubber, the squeegee may be of the form of a rubber sheet 704 (as depicted in wax application apparatus 700 of FIG. 7) with an appropriately selected hole (e.g., based on a diameter of fiber optic cable 112). After exiting the squeegee, fiber optic cable 112 may then be passed through an air knife 612 or other mechanism to cool the wax on fiber optic cable 112. When employing air knife 612, a vortex chiller may be used to further cool the air before blowing the air onto fiber optic cable 112. Air knife 612 may be enclosed within a tube 706 (as illustrated in wax application apparatus 700) in some examples to further concentrate the cooling air around fiber optic cable 112. After being cooled, fiber optic cable 112 may be passed through second roller pair 604, which may pull fiber optic cable 112 upward and onto a second set of idler rollers (not shown in FIG. 6), which may guide fiber optic cable 112 onto the take-up reel.

Figure 8:
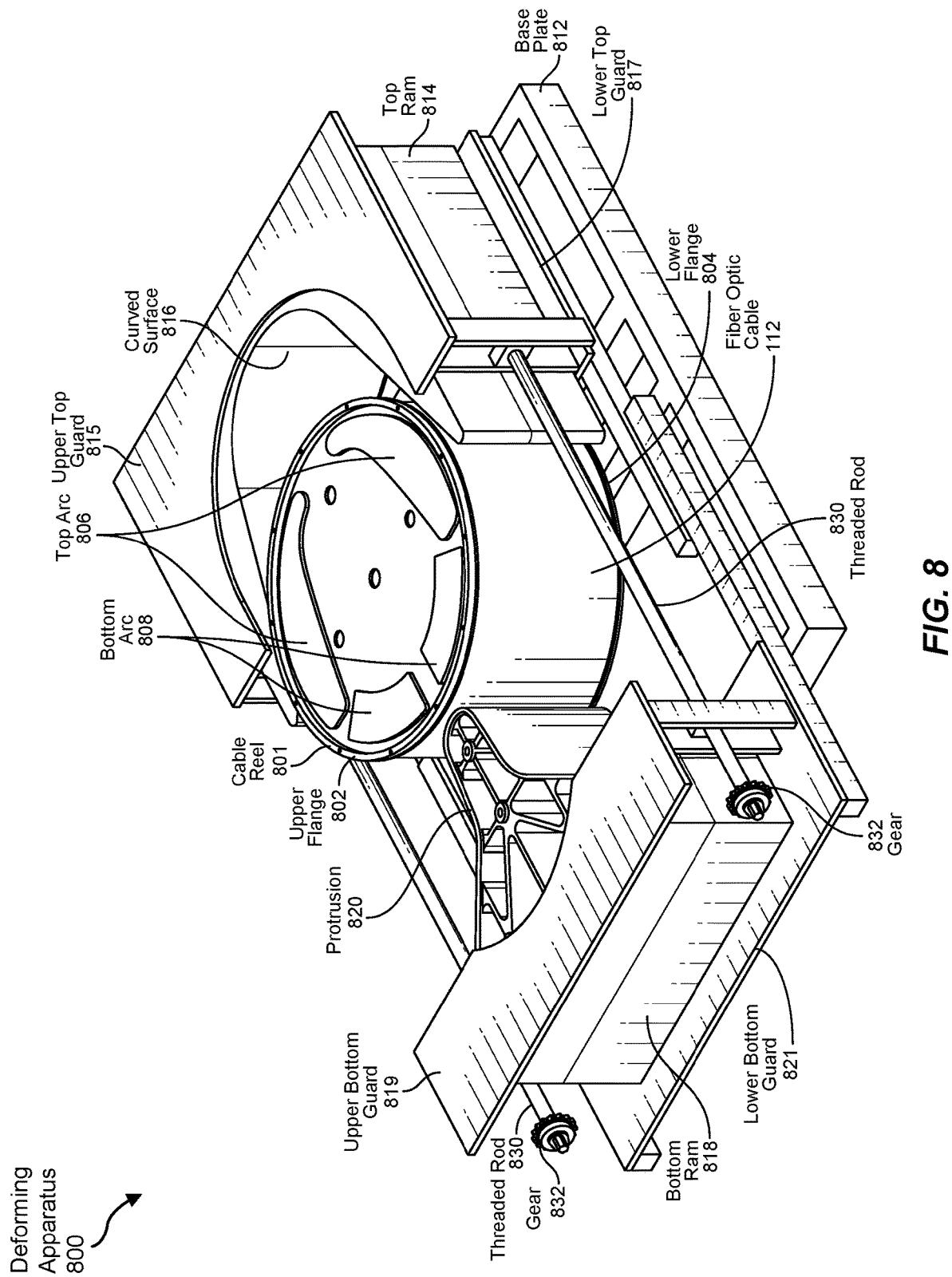
FIGS. 8 and 9 are perspective and top views, respectively, of an exemplary deforming apparatus that deforms a preliminary bundle of fiber optic cable into a deployable bundle of fiber optic cable.
Figure 9:
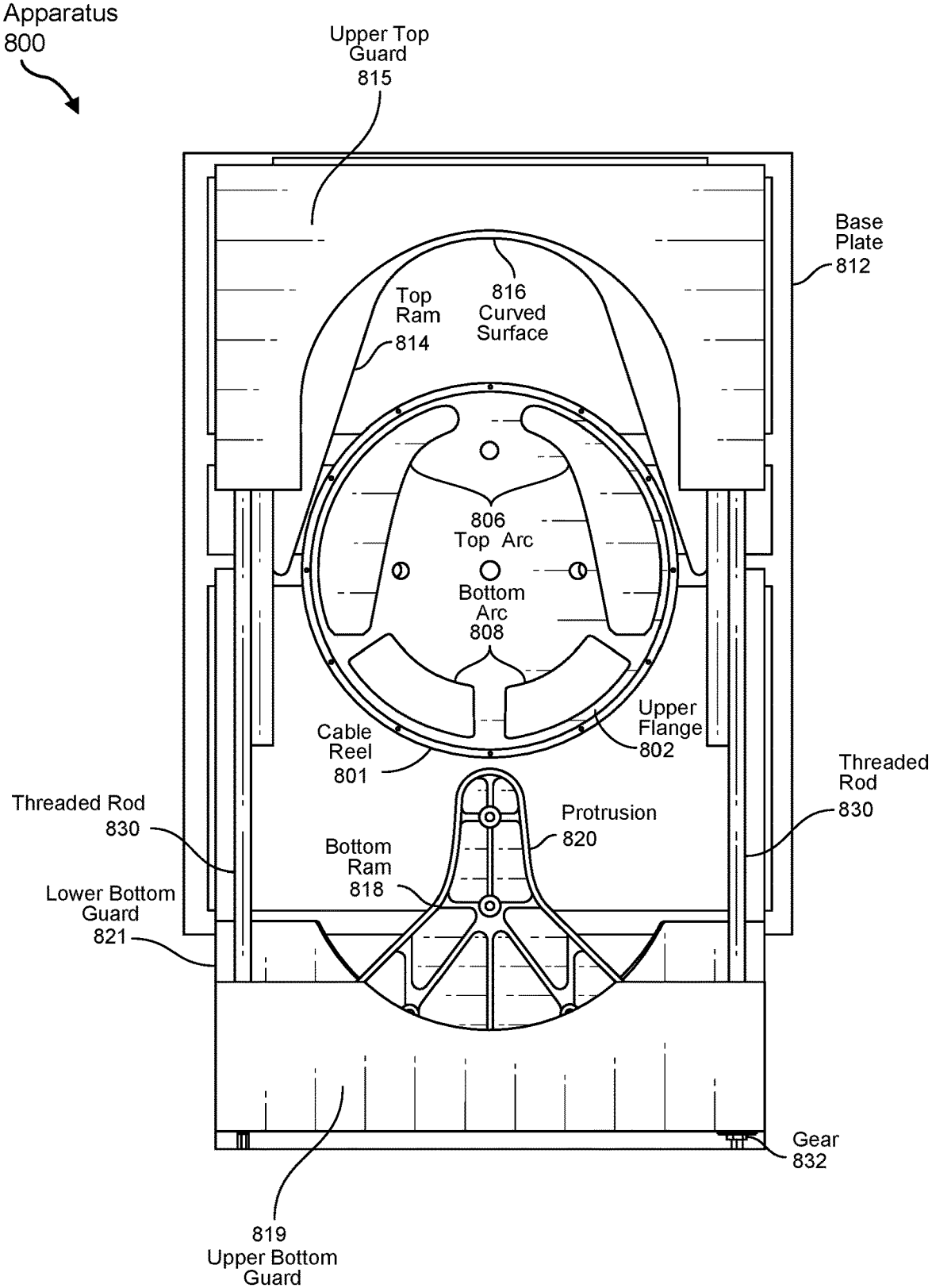

FIGS. 8 and 9 are perspective and top views, respectively, of a deforming apparatus 800 for configuring a segment of fiber optic cable 112 for deployment in a robotic system for installation on a powerline conductor 101, as described above. As indicated above, fiber optic cable 112, after exiting the wax application process described above, may be wound onto a take-up reel. In some embodiments, the take-up reel may be cable reel 801 of FIGS. 8 and 9 that may be specifically designed to enable deformation of the bundle of fiber optic cable 112 via deforming apparatus 800. However, other shapes and structures for cable reel 801 and deforming apparatus 800 not specifically discussed herein may be used in other embodiments.

Cable reel 801 may include three sections: an upper flange 802, a hub section (largely obscured in FIG. 8 by the segment of fiber optic cable 112 wound thereon), and a lower flange 804. Upper flange 802 and/or lower flange 804 may include a plurality of holes and/or features that may interact with other features of deforming apparatus 800 to hold cable reel 801 in place when fiber optic cable 112 is being deformed.

In some embodiments, the hub section of cable reel 801 may include a number of separate components. The hub section, by way of two top arcs or sections 806 and two bottom arcs or section 808 extending from upper flange 802 to lower flange 804, may provide a round circular surface upon which fiber optic cable 112 may be wound onto cable reel 801. In other examples, greater or fewer numbers of top arcs 806 and/or bottom arcs 808 may form at least a part of the hub section. After fiber optic cable 112 is wound onto cable reel 801, portions of hub section may be removed so that fiber optic cable 112 may be deformed, possibly while holding stationary particular sections of fiber optic cable 112 that are not to be deformed. In the particular example of FIGS. 8 and 9, a small portion of fiber optic cable 112 (e.g., at the top of cable reel 801 near curved surface 816, as illustrated in FIGS. 8 and 9) may remain substantially stationary. Additionally, in some embodiments, the hub section may include stationary portions or sections (not depicted in FIGS. 8 and 9) that may be shaped such that, in the absence of top arcs 806 and bottom arcs 808, provide a noncircular surface that may form an inner surface over which fiber optic cable 112 is deformed. In some examples, top arcs 806 and bottom arcs 808 may be removed from cable reel 801 after cable reel 801 is locked into the remainder of deforming apparatus 800 prior to the deforming operation.

Deforming apparatus 800, as illustrated in FIGS. 8 and 9, may include a baseplate 812 on which may be slidably attached a top ram 814 for shaping a top portion of the bundle of fiber optic cable 112 and a bottom ram 818 for shaping a bottom portion of the bundle. More specifically, top ram 814 may provide a curved surface 816 (e.g., a partially curved surface with symmetrical straight side regions) that is forced against the top (peripheral) portion of the bundle, and bottom ram 818 may present a protrusion 820 that is forced against the bottom (peripheral) portion of the bundle (e.g., to reshape preliminary bundle 302 to produce deployable bundle 304 defining slot 306, as discussed above in connection with FIG. 3.) In the example of FIGS. 8 and 9, threaded rods 830 may be coupled to top ram 814 and bottom ram 818 such that rotation of threaded rods 830 (e.g., by way of attached gears 832 driven by one or more electric motors not depicted in FIGS. 8 and 9) may cause both top ram 814 and bottom ram 818 to be forced against the bundle of fiber optic cable 112 wound on cable reel 801 to reshape the bundle in the absence of top arcs 806 and bottom arcs 808. In some examples, deforming apparatus 800 may be configured to reshape one portion of the bundle using one ram (e.g., the top portion using top ram 814) before reshaping the remaining portion (e.g., the bottom portion using bottom ram 818). In other examples, deforming apparatus 800 may be configured to engage fiber optic cable 112 concurrently with both top ram 814 and bottom ram 818. As a result of the deforming operation, in some embodiments, the shape of portions of deployable bundle 304 may match the shape of protrusion 820 and curved surface 816.

As depicted in FIGS. 8 and 9, a width of each of top ram 814 and bottom ram 818 may substantially match a width of the hub section of cable reel 801 between upper flange 802 and lower flange 804 such that top ram 814 and bottom ram 818 may slide between upper flange 802 and lower flange 804 in close proximity to prevent any portion of fiber optic cable 112 from entering between ram 814 or 818 and either upper flange 802 or lower flange 804. In addition, in some embodiments, top ram 814 may be coupled to an upper top guard 815 and a lower top guard 817, while bottom ram 818 may be coupled to an upper bottom guard 819 and a lower bottom guard 821. Each of upper top guard 815, lower top guard 817, upper bottom guard 819 and lower bottom guard 821 may include a curved region substantially matching a circular edge of upper flange 802 or lower flange 804 such that upper top guard 815, lower top guard 817, upper bottom guard 819, and/or lower bottom guard 821 may halt further progress of top ram 814 and bottom ram 818 into the bundle of fiber optic cable 112.

In some embodiments, various surfaces of upper flange 802, the hub section, and lower flange 804, along with top ram 814 and bottom ram 818, may be covered by a non-stick surface or be coated between uses by a mold-release agent or other substance to promote retreat of top ram 814 and bottom ram 818 from fiber optic cable 112 after the deformation operation without disturbing the newly formed shape of fiber optic cable 112.

After the deformation operation described above, in some examples, the entire deforming apparatus 800, including cable reel 801 and fiber optic cable 112, may be placed in an oven. The dimensions of baseplate 812 of deforming apparatus 800 may be designed to allow for deforming apparatus 800 to fit within the oven. In some embodiments, the oven heating temperature and time may be tuned based on the specific wax used such that the wax melts sufficiently so that it bonds the layers of fiber optic cable 112 together while not causing an inordinate amount of the wax to drip from fiber optic cable 112 and not causing the wax to pool downward. Lower flange 804 may include small holes to allow excess wax to drip through, thereby avoiding excessive pooling of wax at the bottom of cable reel 801. In some embodiments, a forced air oven may be employed with a set temperature (e.g., 60 degrees C.).

After undergoing heating, deforming apparatus 800 may be removed from the oven and allowed to cool. Upper flange 802 may include a hole that allows an air line to be attached to accelerate the cable cooling process. After the cooling phase, top ram 814 and bottom ram 818 may be retracted by turning threaded rods 830. Upper flange 802 may be removed from the hub section, thereby exposing fiber optic cable 112 in the configuration of deployable bundle 304. Lower flange 804 then may be removed from baseplate 812 such that deployable bundle 304 can be removed.

Prior to installation of fiber optic cable 112 about powerline conductor 101, deployable bundle 304 may be placed in fiber tub 202 with a similar curved profile. Fiber tub 202, in some embodiments, may include an inner surface texture to provide a level of grip over deployable bundle 304. Fiber tub 202 may also possess the ability for the perimeter to be increased in size temporarily while deployable bundle 304 is loaded into fiber tub 202, thereby improving the grip on deployable bundle 304. In some examples, the inner surface of fiber tub 202 may be coated by a layer of an adhesive substance (e.g., wax), which may be heated to gently bond the inner surface with an outermost layer of deployable bundle 304.

As discussed above in conjunction with FIGS. 1-9, apparatuses and methods described herein may result in a spool-free fiber optic cable configuration or bundle for use in a helical wrapping robotic system that may possess a center of mass close to the center of rotation or orbit of the cable bundle, which may be coincident with the center of powerline conductor 101. Also, in some embodiments, the resulting cable bundle may occupy a minimal radius about powerline conductor 101 and possess a minimal overall length, all while refraining from subjecting fiber optic cable 112 to a bend radius smaller than the manufacturer-specified bend radius, and while minimizing any fiber pumping that may occur when turning fiber optic cable 112 continually in a small bend radius, as may be done in conjunction with some spool systems.

EXAMPLE EMBODIMENTS

Example 1: A method may include (1) coating a segment of fiber optic cable with an adhesive substance, (2) forming a coil of the segment of fiber optic cable, (3) deforming the coil into a noncircular shape defining a slot external to the coil while obeying a minimum bend radius requirement for the segment of fiber optic cable, and (4) activating the adhesive substance to stabilize the noncircular shape of the coil.

Example 2: The method of Example 1, where coating the segment of fiber optic cable may be performed before forming the coil.

Example 3: The method of Example 1, where (1) the adhesive substance may include paraffin and (2) activating the adhesive substance may include heating the coil.

Example 4: The method of Example 1, where the coil may include a circular shape prior to deforming the coil.

Example 5: The method of Example 1, where the method may include pre-twisting the segment of fiber optic cable prior to forming the coil.

Example 6: The method of Example 5, where pre-twisting the segment of fiber optic cable may be performed at a rate that cancels a twisting to be applied to the segment of fiber optic cable during subsequent wrapping of the segment of fiber optic cable about a powerline conductor.

Example 7: The method of any one of Examples 1-6, where deforming the coil may include applying a first force to a first portion of a perimeter of the coil to form the slot.

Example 8: The method of Example 7, where the first force may be applied using a first ram with a surface having a shape of the slot.

Example 9: The method of Example 7, where deforming the coil may further include applying a second force to a second portion of the perimeter of the coil opposite the first portion.

Example 10: The method of Example 9, where the second force may be applied using a second ram with a surface having a shape different from the slot.

Example 11: An apparatus may include (1) a reel including a hub section that carries a coil of a segment of fiber optic cable, where the hub section includes at least one first removable section upon which the coil is carried, (2) a base that securely maintains the reel carrying the coil, (3) a first ram including a protruding surface facing a first portion of a perimeter of the coil at which the at least one first removable section of the hub section is positioned, and (4) a mechanism that facilitates movement of the first ram to the first portion of the perimeter of the coil such that, when the at least one first removable section of the hub section is absent, the coil is deformed into a noncircular shape defining a slot external to the coil while obeying a minimum bend radius requirement for the segment of fiber optic cable.

Example 12: The apparatus of Example 11, where the slot possesses a shape matching the protruding surface.

Example 13: The apparatus of either one of Example 11 or Example 12, where (1) the reel may further include a first flange and a second flange coupled to opposing ends of the hub section and (2) the protruding surface of the first ram may be sized to span a length of the hub section and to enter between the first flange and the second flange.

Example 14: The apparatus of Example 13, where the apparatus may further include a first guard coupled to the first ram, where the first guard is positioned to contact at least one of the first flange or the second flange to prevent further progress of the protruding surface of the first ram into the coil.

Example 15: The apparatus of Example 11, where the apparatus may further include at least one threaded rod that, when rotated, urges the first ram toward the first portion of the perimeter of the coil.

Example 16: The apparatus of either one of Example 11 or Example 12, where (1) the hub section may further include at least one second removable section upon which the coil is carried, (2) the apparatus may further include a second ram with a surface having a shape different from the slot, where the mechanism facilitates movement of the second ram to a second portion of the perimeter of the coil at which the at least one second removable section of the hub section is positioned, and (3) the mechanism may facilitate movement of the second ram to the second portion of the perimeter of the coil such that, when the at least one second removable section of the hub section is absent, the coil is further deformed.

Example 17: The apparatus of Example 16, where the second portion may be opposite the first portion of the perimeter of the coil.

Example 18: The apparatus of Example 16, where the shape of the surface of the second ram may include at least one linear portion.

Example 19: A method may include (1) wrapping a segment of fiber optic cable about a hub section of a reel to form a coil, where the hub section includes at least one first removable section upon which the coil is carried, where the at least one first removable section corresponds to a first portion of a perimeter of the coil, (2) coupling the reel to a base portion of a deforming apparatus, (3) removing the at least one first removable section from the hub section of the reel, and (4) moving a first ram toward the first portion of the perimeter of the coil such that a protruding surface of the first ram deforms the coil into a noncircular shape defining a slot external to the coil while obeying a minimum bend radius requirement for the segment of fiber optic cable.

Example 20: The method of Example 19, where (1) the hub section may include at least one second removable section upon which the coil is carried, (2) the at least one second removable section may correspond to a second portion of the perimeter of the coil, and (3) the method may further include (a) removing the at least one second removable section from the hub section of the reel and (b) moving a second ram toward the second portion of the perimeter of the coil such that a surface of the second ram further deforms the coil while obeying the minimum bend radius requirement for the segment of fiber optic cable.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    coating a segment of fiber optic cable with an adhesive substance;
    forming a coil of the segment of fiber optic cable;
    deforming the coil into a noncircular shape defining a slot external to the coil while obeying a minimum bend radius requirement for the segment of fiber optic cable; and
    activating the adhesive substance to stabilize the noncircular shape of the coil.

2. The method of claim 1, wherein coating the segment of fiber optic cable is performed before forming the coil.

3. The method of claim 1, wherein:
    the adhesive substance comprises paraffin; and
    activating the adhesive substance comprises heating the coil.

4. The method of claim 1, wherein the coil comprises a circular shape prior to deforming the coil.

5. The method of claim 1, further comprising pre-twisting the segment of fiber optic cable prior to forming the coil.

6. The method of claim 5, wherein pre-twisting the segment of fiber optic cable is performed at a rate that cancels a twisting to be applied to the segment of fiber optic cable during subsequent wrapping of the segment of fiber optic cable about a powerline conductor.

7. The method of claim 1, wherein deforming the coil comprises applying a first force to a first portion of a perimeter of the coil to form the slot.

8. The method of claim 7, wherein the first force is applied using a first ram with a surface having a shape of the slot.

9. The method of claim 7, wherein deforming the coil further comprises applying a second force to a second portion of the perimeter of the coil opposite the first portion.

10. The method of claim 9, wherein the second force is applied using a second ram with a surface having a shape different from the slot.

11. A method comprising:
    wrapping a segment of fiber optic cable about a hub section of a reel to form a coil, wherein the hub section comprises at least one first removable section upon which the coil is carried, wherein the at least one first removable section corresponds to a first portion of a perimeter of the coil;
    coupling the reel to a base portion of a deforming apparatus;

removing the at least one first removable section from the hub section of the reel; and moving a first ram toward the first portion of the perimeter of the coil such that a protruding surface of the first ram deforms the coil into a noncircular shape defining a slot external to the coil while obeying a minimum bend radius requirement for the segment of fiber optic cable.

12. The method of claim 11, wherein:

the hub section comprises at least one second removable section upon which the coil is carried;

the at least one second removable section corresponds to a second portion of the perimeter of the coil; and the method further comprises:

removing the at least one second removable section from the hub section of the reel; and moving a second ram toward the second portion of the perimeter of the coil such that a surface of the second ram further deforms the coil while obeying the minimum bend radius requirement for the segment of fiber optic cable.

\* \* \* \* \*